Aug. 19, 1958     H. OETIKER     2,847,742
HOSE CLAMP
Filed March 12, 1957
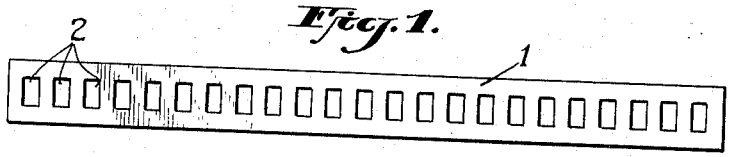
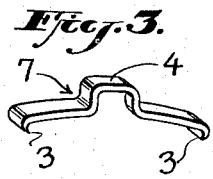
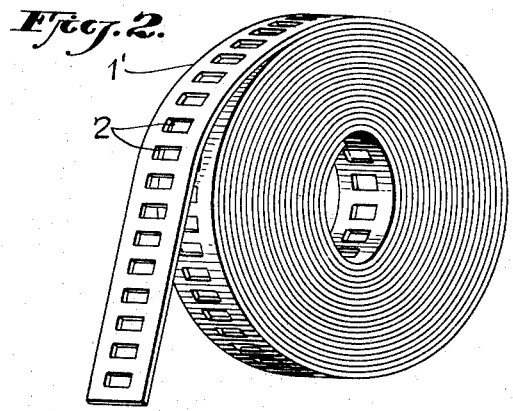
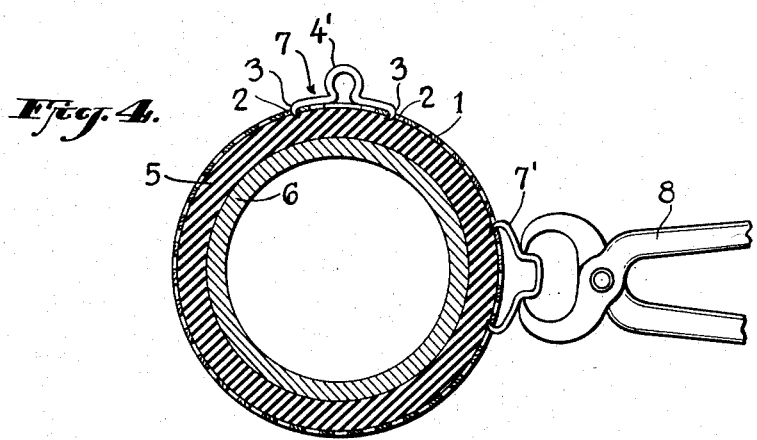
INVENTOR.
HANS OETIKER.
BY
ATTORNEY.

United States Patent Office 2,847,742
Patented Aug. 19, 1958

2,847,742

HOSE CLAMP

Hans Oetiker, Horgen, Switzerland

Application March 12, 1957, Serial No. 645,505

Claims priority, application Switzerland March 14, 1956

5 Claims. (Cl. 24—19)

The present invention relates to a hose or tube clamp which consists of two separate parts that can be assembled to form a ring. One part of the clamp according to the invention is in the form of a metal band provided with perforations and bent to form an open ring adapted to be slipped on to the hose. The second part is a relatively short and rigid metal band bent to have a U-shaped compressible central body portion and to have a claw or hook at each end. The hook shaped ends of this second part are adapted to be hooked into the perforations at the ends of the first part so that the second part forms a bridge between the ends of the first part. Upon compressing the legs of the U of the U-shaped portion of the second part which may be called a bridge member, the central portion of the latter assumes the configuration of the Greek letter Ω. The bridge is thereby shortened and the hooks at the ends of the bridge member and therewith the ends of the band forming the first part are pulled towards each other so that the perforated metal band is tightened onto the hose.

The perforated metal band may be somewhat shorter than the circumference of the hose for which it is used or may be supplied in any length and preferably reeled to be cut to lengths suitable for the tubes which must be tightened onto tubes or parts extending into the tubes. The perforations may have any suitable shape. They are preferably in the form of rectangular apertures whose long axis is transverse to the longitudinal axis of the metal band.

The claws or hooks at the ends of the bridge member must be formed to suit the perforations and ensure a good hold therein.

The central portion of the bridge member may have one or more U-shaped bends to suit individual requirements. The greater the number of bends the more the bridge member can be shortened and the more the band can be tightened. The legs of the U of the U-shaped bends should be parallel or slightly converging so as to give a good hold for the tightening tool which is preferably a pair of pliers.

The distance between the claws at the ends of the bridge member should be such that the bridge member can be applied to any part of the perforated band whereby the claws or hooks always fit into an aperture. If this is so, bridge members can be fitted on any portion of the perforated band in addition to the bridge member connecting the ends of the band. By shortening the additional bridge members by squeezing their respective U-shaped portions the circumference of the ring formed by the perforated band can be further reduced and the hose further tightened.

The novel features which are considered characteristic of the invention are set forth with particularity in the appended claims. The invention itself, however, and additional objects and advantages thereof will best be understood from the following description of embodiments thereof when read in connection with the accompanying drawing in which:

Fig. 1 is a top view of a perforated metal band forming part of the clamp according to the invention;

Fig. 2 is a perspective view of a reeled perforated metal band;

Fig. 3 is a perspective view of a bridge or clamp member forming part of the clamp according to the invention;

Fig. 4 is a cross sectional view of a hose clamped to a metal tube by the device according to the invention;

Fig. 5 is a side view of a modified bridge or clamp member.

Like parts are designated by like numerals in all figures of the drawing.

Fig. 1 shows a flat metal band 1 ready to be bent around the hose to be tightened and provided with rectangular apertures 2.

The bands 1 may be cut from a reeled band 1' as shown in Fig. 2.

The bridge member 7 shown in Fig. 3 has a hook 3 at each end and a U-shaped bend 4 in the center.

Fig. 4 shows a metal tube 6 to which a hose 5 must be tightened. This is done by placing a perforated band 1 around the hose and inserting the hooks 3 of a bridge member 7 into the apertures 2 at the ends of the band 1. Fig. 4 shows the bridge member 7 with its U-shaped portion squeezed to form an almost closed ring 4'. Due to this compression the circumference of the ring formed by the band 1 has been reduced and the hose 5 has been tightened around the tube 6.

The pressure applied to the hose can be increased by applying a second bridge member 7' to an intermediate part of the band 1 and squeezing its U-shaped portion by pliers 8. The claws or hooks of the member 7' are so spaced that they fit into apertures of the band 1 prior to compression of its U-shaped portion.

Fig. 5 illustrates a bridge member having two U-shaped bends providing a greater flexibility of the tightening effect of the bridge member.

The bridge members according to the invention can be used for any tube diameter and it is not necessary to stock different sizes of bridge members to suit different tube diameters. The perforated metal band is preferably stocked in reels from which any number and lengths of individual bands can be cut to clamp any number of hoses of any diameter.

By applying more than one bridge member to the band of one hose clamp any pressure can be produced on tubes of any diameter.

I claim:

1. In a hose clamp for tightening a hose to a rigid cylindrical member, the combination of a metal band laid around and tightened onto the hose to be clamped and having a plurality of perforations, and a bridge member having a compressible body portion and hooked end portions spaced to be hooked into the perforations at the ends of said metal band prior to tightening of the band, said body portion being compressed for shortening the distance between said hooks and tightening said metal band to the hose.

2. In a hose clamp as defined in claim 1 and wherein said compressible body portion of said bridge member has a portion of substantially U-shaped configuration, compression of the bridge member being effected by squeezing the legs of the U together.

3. In a hose clamp as defined in claim 1 and wherein the perforations in said metal band are in the form of rectangular apertures, the long axis of said apertures being transverse to the longitudinal axis of said band.

4. A hose clamp comprising a metal band adapted to be laid around a hose to be clamped and having a plurality of perforations and a compressible bridge member having hooked end portions adapted to be hooked into perforations at the ends of said metal band, said bridge member having a plurality of U-shaped portions adapted to be individually transformed into the configuration of the Greek letter Ω for compressing the bridge member.

5. In a hose clamp for tightening a hose to a rigid cylindrical member, a metal band laid around and tightened to the hose to be clamped and having a plurality of perforations, means for interconnecting the ends of said band, and a member having a compressible body portion and claw shaped end portions spaced to be individually inserted into selected perforations of said band prior to tightening of the band, said body portion being compressed for shortening the distance between said claw shaped end portions and tightening said metal band to the hose.

References Cited in the file of this patent

UNITED STATES PATENTS

| | | |
|---|---|---|
| 1,035,963 | Heger | Aug. 20, 1912 |
| 1,874,731 | Younce | Aug. 30, 1932 |

FOREIGN PATENTS

| | | |
|---|---|---|
| 542,031 | France | May 11, 1922 |